US012257828B2

(12) United States Patent
Tsuchimori et al.

(10) Patent No.: US 12,257,828 B2
(45) Date of Patent: Mar. 25, 2025

(54) TAPE CASSETTE

(71) Applicant: BROTHER KOGYO KABUSHIKI KAISHA, Nagoya (JP)

(72) Inventors: Shohei Tsuchimori, Nagoya (JP); Yukiko Takami, Inazawa (JP); Takashi Horiuchi, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 128 days.

(21) Appl. No.: 18/059,399

(22) Filed: Nov. 28, 2022

(65) Prior Publication Data

US 2023/0166543 A1 Jun. 1, 2023

(30) Foreign Application Priority Data

Nov. 30, 2021 (JP) ................................ 2021-194171

(51) Int. Cl.

*B41J 15/04* (2006.01)
*B41J 3/407* (2006.01)
*B41J 32/00* (2006.01)

(52) U.S. Cl.

CPC .................................. *B41J 15/046* (2013.01)

(58) Field of Classification Search

CPC ... B41J 15/046; B41J 32/00; B41J 3/36; B41J 3/4075; B41J 15/044

See application file for complete search history.

(56) References Cited

U.S. PATENT DOCUMENTS 5,620,268 A * 4/1997 Yamaguchi ................ B41J 3/46 400/613
2018/0015757 A1* 1/2018 Nakai ...................... B41J 32/00

FOREIGN PATENT DOCUMENTS

JP 2000-94773 A 4/2000
JP 2004-42468 A 2/2004
JP 2016-193521 A 11/2016

* cited by examiner

*Primary Examiner* — Jason S Uhlenhake

(74) *Attorney, Agent, or Firm* — KENEALY VAIDYA LLP

(57) ABSTRACT

The tape cassette includes a housing, a tape spool, a tape, a first guide, a second guide, and a plurality of pins. The housing has an outlet. The tape spool is held inside the housing. The tape is wound around the tape spool. The first guide is configured to guide the tape toward a detection position where tape information of the tape is detected by a sensor of a printer. The second guide is configured to guide the tape that has been conveyed through the detection position toward the outlet. The plurality of pins is disposed at positions away from a straight line connecting the tape spool with the first guide. The pins are configured to cause a conveyance path of the tape from the tape spool to the first guide to be curved, and guide the tape to the first guide along the conveyance path.

15 Claims, 9 Drawing Sheets

TAPE CASSETTE

REFERENCE TO RELATED APPLICATIONS

This application claims priority from Japanese Patent Application No. 2021-194171 filed on Nov. 30, 2021. The entire content of the priority application is incorporated herein by reference.

BACKGROUND ART

Present disclosure relates to a tape cassette.

A tape cassette is provided with a tape roll, a first rotation body, a second rotation body, a discharge port, and an opening. A tape is wound around the tape roll. The first rotation body is provided upstream of the opening in a conveyance path of the tape. The second rotation body is provided downstream of the opening in the conveyance path of the tape. The first rotation body guides the tape fed out from the tape roll toward the second rotation body. The second rotation body guides the tape conveyed by the first rotation body toward the discharge port. A sensor of a printer is inserted into the opening. The sensor detects tape information of the tape being conveyed between the first rotation body and the second rotation body.

DESCRIPTION

In the above-described tape cassette, the conveyance path of the tape from the tape roll to the first rotation body is a straight line, and a distance between the tape roll and the first rotation body is long. The rigidity of the tape changes depending on the difference of the type, such as the thickness and width, the material, and the like, and thus, depending on the type of the tape, in the tape cassette, the conveyance of the tape becomes unstable.

Various embodiments of the general principles described herein provide a tape cassette capable of conveying a tape in a stable manner.

Embodiments herein provide a tape cassette configured to be mounted in a printer. The tape cassette includes a housing, a tape spool, a tape, a first guide, a second guide, and a plurality of pins. The housing has an outlet. The tape spool is held inside the housing. The tape is wound around the tape spool. The first guide is configured to guide the tape toward a detection position where tape information of the tape is detected by a sensor of the printer. The second guide is configured to guide the tape that has been conveyed through the detection position toward the outlet. The plurality of pins is disposed at positions away from a straight line connecting the tape spool with the first guide. The pins are configured to cause a conveyance path from the tape spool to the first guide to be curved, and guide the tape to the first guide along the conveyance path.

The tape cassette causes the conveyance path of the tape to be curved, using the plurality of pins. In this way, the tape fed out from the tape roll is conveyed to the detection position via the plurality of pins. Thus, the tape cassette can convey the tape in a stable manner. Further, using the plurality of pins, the tape cassette can configure a plurality of mutually difference conveyance paths. Thus, when the tape having different characteristics is housed, the tape cassette can convey the tape using the conveyance path suited to those characteristics. In this way, in the tape cassette, a pulling out force of the tape when the tape is conveyed is stable.

Figure 1:
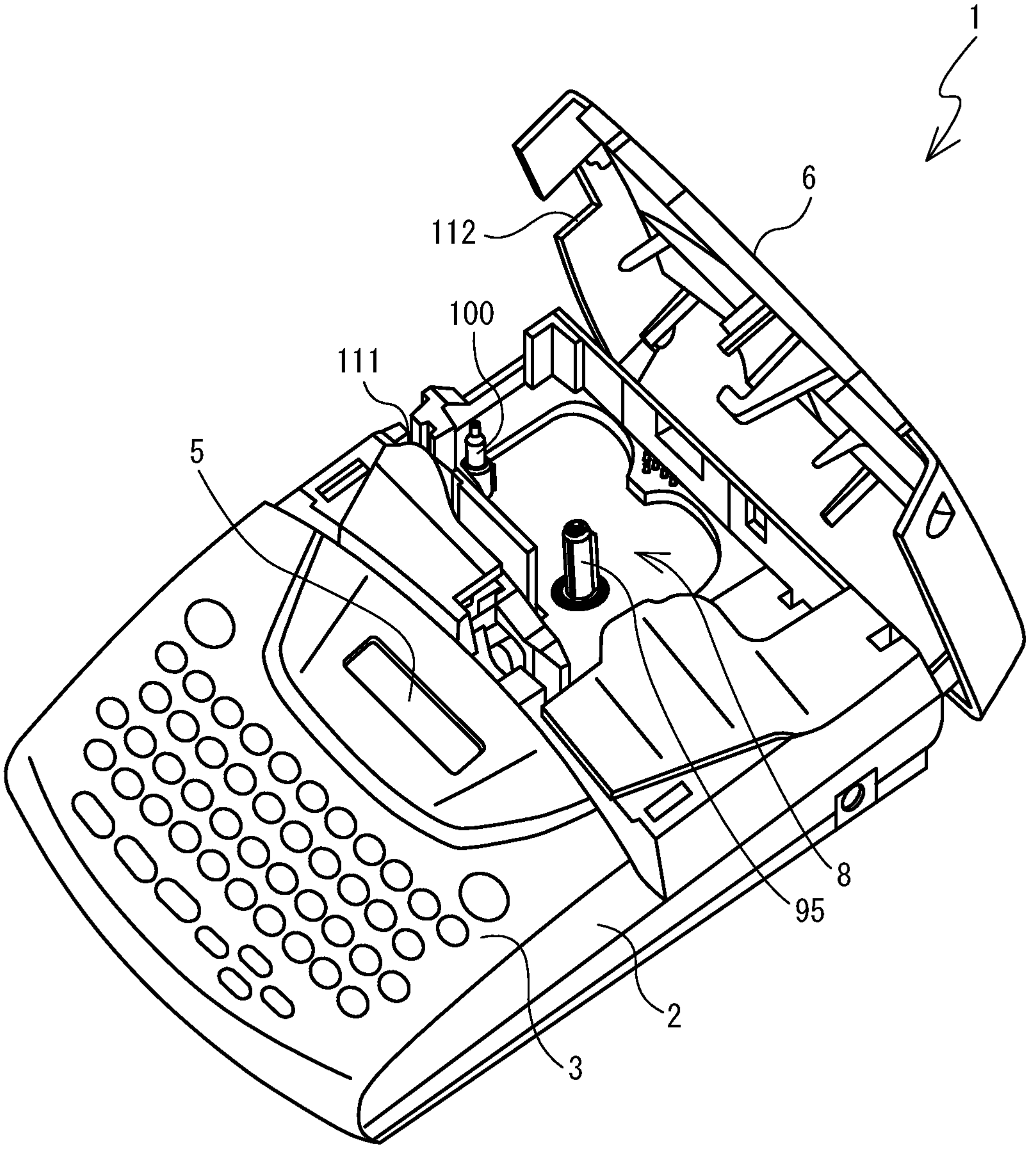
FIG. 1 is a perspective view of a printer with a cassette cover in an open position.
Figure 2:
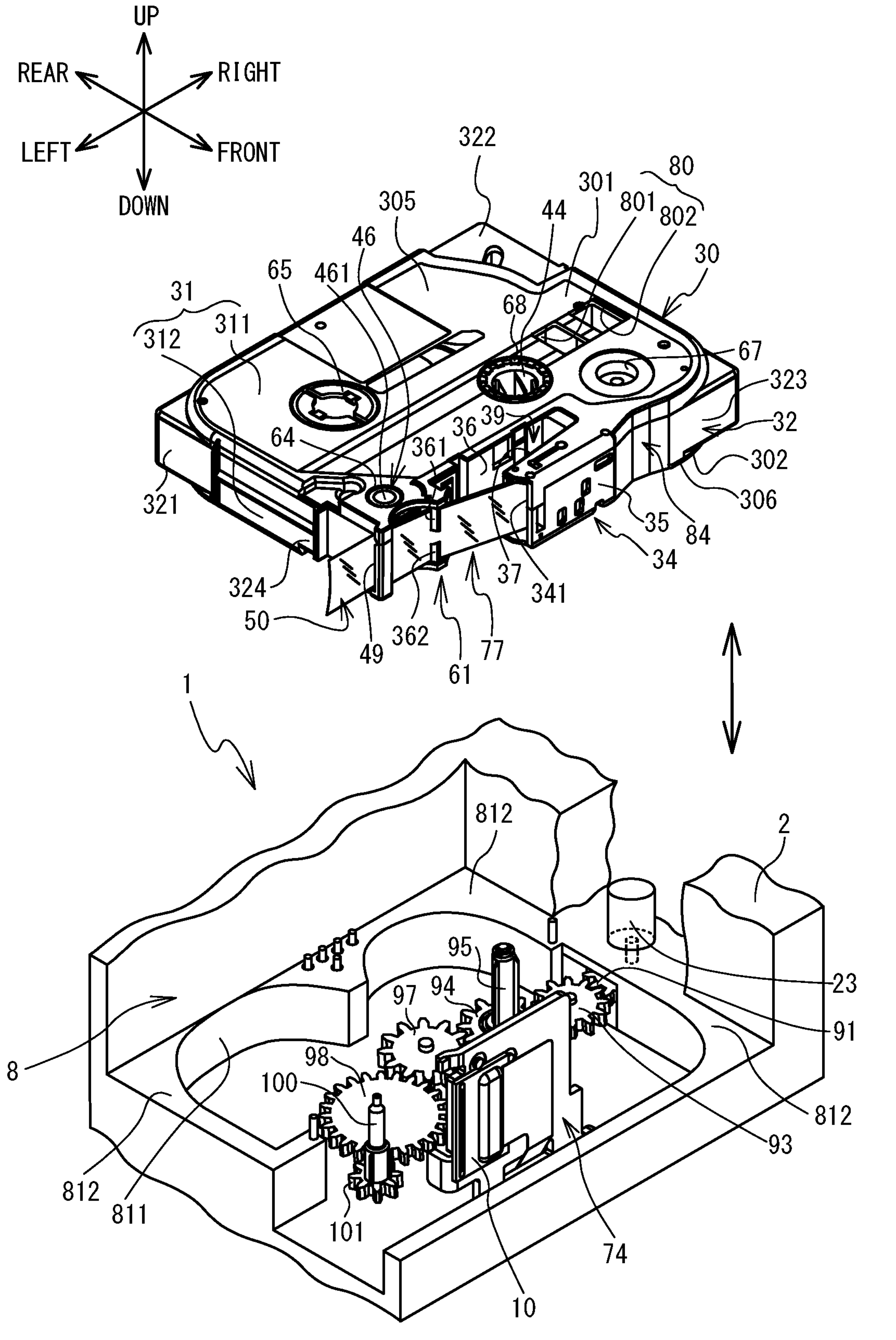
FIG. 2 is a perspective view for illustrating a tape cassette and a cassette housing.

A printer 1 and a tape cassette 30 according to the present embodiment will be described. In the following description, the lower left direction, the upper right direction, the lower right direction, the upper left direction, the upper direction, and the lower direction in FIG. 1 are, respectively, the front direction, the rear direction, the right direction, the left direction, the upper direction, and the lower direction of the printer 1. The lower right direction, the upper left direction, the upper right direction, the lower left direction, the upper direction, and the lower direction in FIG. 2 are, respectively, the front direction, the rear direction, the right direction, the left direction, the upper direction, and the lower direction of the tape cassette 30.

Hereinafter, various tapes housed in the tape cassette 30 (a print tape and a half-cut tape 57 to be described later, for example) will be generically referred to as a tape. A type of the tape housed in the tape cassette 30 (a tape width, a print format, a tape color, character color, and the like) will be generically referred to as a tape type.

The printer 1 will be described with reference to FIG. 1 to FIG. 3. The printer 1 is a general-purpose tape printer that can use, as the single printer, various types of tape cassettes, such as a thermal type, a receptor type, a laminate type, a half-cut type, and the like. The thermal type tape cassette is provided with a heat-sensitive tape. The receptor type tape cassette is provided with a print tape and an ink ribbon. The laminate type tape cassette is provided with a double-sided adhesive tape, a film tape and an ink ribbon. The half-cut type tape cassette is provided with a half-cut tape and an ink ribbon.

As shown in FIG. 1, the printer 1 is provided with a substantially cuboid-shaped main body cover 2. A keyboard 3, which includes character keys and function keys is disposed at the front of the upper surface of the main body cover 2. A display 5, which can display characters (letters, numerals, graphics) and the like input using the keyboard 3 is provided to the rear of the keyboard 3. A cassette cover 6, which is opened and closed when the tape cassette 30 (refer to FIG. 2) is replaced, is provided to the rear of the display 5.

The cassette cover 6 is a lid that has a substantially rectangular shape in a plan view. The cassette cover 6 is axially supported at both left and right ends at an upper portion of the back surface of the main body cover 2, and can rotate between a closed position (not shown in the drawings) and an open position shown in FIG. 1. A cassette housing 8 is provided inside the main body cover 2. The tape cassette 30 can be mounted in and removed from the cassette housing 8.

A discharge slit 111 is provided at the rear of the left side surface of the main body cover 2. The discharge slit 111 discharges the printed tape from the cassette housing 8. A discharge window 112 is provided at the left side surface of the cassette cover 6. When the cassette cover 6 is at the closed position, the discharge window 112 exposes the discharge slit 111 to the outside.

An internal structure of the main body cover 2 will be described with reference to FIG. 2 and FIG. 3. As shown in FIG. 2, the cassette housing 8 includes a cavity 811 and corner supports 812. The cavity 811 is a recess including a planar bottom surface. The recess of the cavity 811 corresponds to a shape of a bottom surface 302 of a cassette case 31. The corner supports 812 are planar portions that extend horizontally from outer edges of the cavity 811. When the tape cassette 30 is mounted in the cassette housing 8, the corner supports 812 support a lower surface of a peripheral edge of the tape cassette 30.

Figure 3:
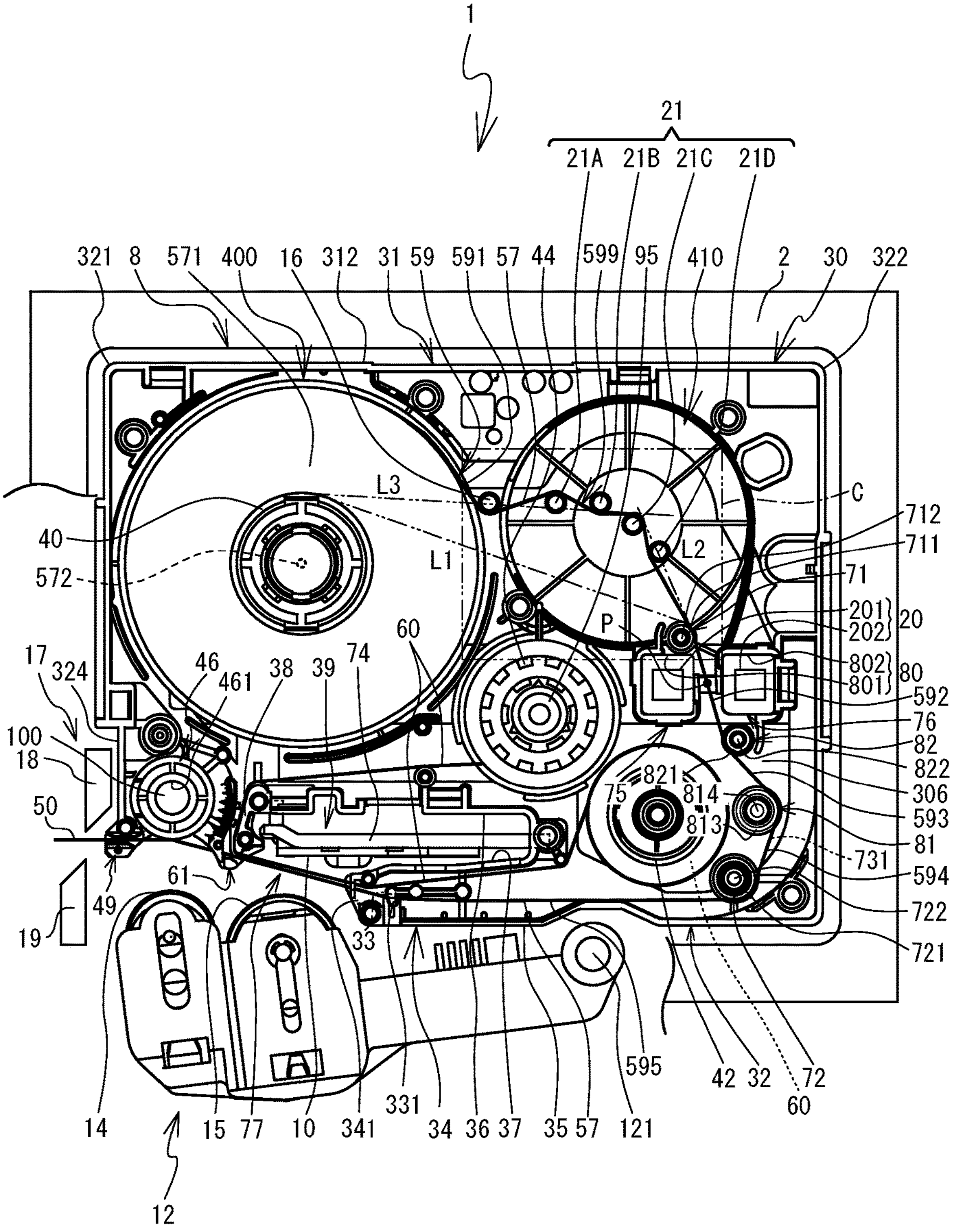
FIG. 3 is a plan view of the cassette housing in which the tape cassette is mounted.

As shown in FIG. 3, a sensor 20 is provided at the right of the cassette housing 8. The sensor 20 includes sensors 201 and 202. The sensors 201 and 202 are disposed facing each other at the left and the right. The sensor 201 is positioned to the left of the sensor 202. One of the sensors 201 and 202 is a light-emitting portion and the other is a light-receiving portion. The light-emitting portion emits light. The light-receiving portion receives the light emitted from the light-emitting portion.

When the tape cassette 30 is mounted in the cassette housing 8, the sensors 201 and 202 are respectively disposed on the inside of openings 801 and 802 to be described later. The sensor 20 detects a pattern provided at a predetermined range from an end of the tape conveyed between the sensor 201 and the sensor 202. The printer 1 detects a remaining amount of the tape, from among tape information, on the basis of the detected pattern. Hereinafter, a position of the tape conveyed between the sensor 201 and the sensor 202 will be referred to as a "detection position P." Of a conveyance path 59 of the tape, a position in the vicinity of the sensor 20 upstream of the detection position P will be referred to as an entrance to the detection position P, and a position in the vicinity of the sensor 20 downstream of the detection position P will be referred to as an exit from the detection position P.

As shown in FIG. 2, a head holder 74 is provided at the front of the cassette housing 8. A thermal head 10 is mounted in the head holder 74. A tape feed motor 23 is provided to the right of and above the cassette housing 8. The tape feed motor 23 is a stepping motor, for example. A gear 91 is affixed to the lower end of a drive shaft of the tape feed motor 23. The gear 91 meshes with a gear 93 through an opening. The gear 93 meshes with a gear 94. The gear 94 meshes with a gear 97. The gear 97 meshes with a gear 98. The gear 98 meshes with a gear 101.

A ribbon winding shaft 95 is provided in a vertical orientation on the upper surface of the gear 94. The ribbon winding shaft 95 is a shaft to which a ribbon winding spool 44 can be removably mounted. The ribbon winding shaft 95 is a shaft body that extends in the up-down direction. A tape drive shaft 100 is provided in a vertical orientation on the upper surface of the gear 101. The tape drive shaft 100 is a shaft body which can be removably mounted in a hole 461 of a tape drive roller 46.

When the tape feed motor 23 rotationally drives the gear 91 in the counterclockwise direction, the ribbon winding shaft 95 is rotationally driven in the counterclockwise direction via the gear 93 and the gear 94. The rotation of the gear 94 is transmitted to the tape drive shaft 100 via the gear 97, the gear 98, and the gear 101. In this way, the tape drive shaft 100 is rotationally driven in the clockwise direction.

An arm-shaped platen holder 12 is provided to the front of the head holder 74. The platen holder 12 is axially supported such that the platen holder 12 can rotate around a shaft support 121. A platen roller 15 and a movable feed roller 14 are axially supported at a leading end of the platen holder 12 so as to be rotatable. The platen roller 15 is able to come into contact with and separate from the thermal head 10. The movable feed roller 14 is able to come into contact with and separate from the tape drive roller 46.

When the half-cut type tape cassette 30 is mounted in the cassette housing 8, the platen roller 15 presses the thermal head 10 via the half-cut tape 57 and an ink ribbon 60. At the same time, the movable feed roller 14 presses the tape drive roller 46 via the half-cut tape 57. In this case, the printer 1 can perform printing on the half-cut tape 57.

A cutting mechanism 17 that cuts a printed tape 50 at a predetermined position is provided to the right of the discharge slit 111 (refer to FIG. 1). The cutting mechanism 17 includes a fixed blade 18 and a moving blade 19. The moving blade 19 is able to move in the front-rear direction with respect to the fixed blade 18.

An external appearance of the tape cassette 30 will be described with reference to FIG. 2. The tape cassette 30 can change the type of the tape housed internally as appropriate. For example, the half-cut tape and the like can be mounted in the tape cassette 30. In the following description, the tape cassette 30 will be described in which the half-cut tape 57 is mounted, for example.

The tape cassette 30 is provided with the cassette case 31 that is a housing. The cassette case 31 has a rectangular shape and includes corners that are rounded in a plan view. The cassette case 31 includes a top case 311 and a bottom case 312. The bottom case 312 includes a bottom plate 306 that includes the bottom surface 302 of the cassette case 31. The top case 311 is affixed to the upper portion of the bottom case 312. The top case 311 includes a top plate 305. The top plate 305 includes a top surface 301 of the cassette case 31.

In the cassette case 31, side surfaces are formed by the top plate 305 and the bottom plate 306. The side surfaces of the cassette case 31 include four corners 321 to 324. When the tape cassette 30 is mounted in the cassette housing 8, bottom surfaces of the corners 321 to 324 are supported by the corner supports 812. A discharge guide portion 49 is provided at the corner 324.

Three support holes 65, 67, and 68 are provided in the cassette case 31. Holes provided at the rear left and the front right of the cassette case 31 will be respectively referred to as the first tape support hole 65 and the ribbon support hole 67. A hole that is provided between the first tape support hole 65 and the ribbon support hole 67 in a plan view will be referred to as the winding spool support hole 68.

The first tape support hole 65 supports a tape spool 40 (refer to FIG. 3) such that the tape spool 40 can rotate. The ribbon support hole 67 supports a ribbon spool 42 (refer to FIG. 3) such that the ribbon spool 42 can rotate. The winding spool support hole 68 supports the ribbon winding spool 44 (refer to FIG. 3) such that the ribbon winding spool 44 can rotate.

An opening 80 is provided at the right end of the cassette case 31 and at the center of the cassette case 31 in the front-rear direction. The opening 80 includes a pair of openings 801 and 802. The openings 801 and 802 are aligned so as to be separated from each other to the left and right. The opening 802 is positioned to the right of the opening 801. The openings 801 and 802 have a rectangular shape that is long in the front-rear direction in a plan view. The openings 801 and 802 are openings passing through the bottom plate 306 and the top plate 305 in the up-down direction. Note that the openings 801 and 802 are respectively defined by a first regulating portion 75 and a second regulating portion 76.

A front surface wall 32, an arm front surface wall 35, and an arm rear surface wall 37 are provided at the front end of the cassette case 31. The front surface wall 32 is provided on the right at the front end of the cassette case 31. The arm front surface wall 35 is provided on the left of the front surface wall 32. The arm rear surface wall 37 is provided at a position separated, to the rear, from the arm front surface wall 35.

An arm 34 is defined by the arm front surface wall 35, the arm rear surface wall 37, and the like. The arm 34 extends to the left from the front right of the tape cassette 30. The arm 34 includes a discharge outlet 341, at the left end of the arm 34. The discharge outlet 341 is a gap that extends in the up-down direction between the left end of the arm front surface wall 35 and the left end of the arm rear surface wall 37.

A head insertion portion 39 is disposed to the rear of and adjacent to the arm 34. The head insertion portion 39 is defined by the arm rear surface wall 37, a head peripheral wall 36, and the like. The head peripheral wall 36 extends to the rear from the right end of the arm rear surface wall 37, and extends in parallel to the arm rear surface wall 37. The head insertion portion 39 passes through the tape cassette 30 in the up-down direction. The head insertion portion 39 is a space that has a substantially rectangular shape in a plan view.

The head insertion portion 39 is connected to the outside at a front surface of the tape cassette 30, via an exposure portion 77. When the tape cassette 30 is mounted in the cassette housing 8, the head holder 74 supporting the thermal head 10 is inserted into the head insertion portion 39. A separator portion 61 and the discharge guide portion 49 will be described later.

The interior of the cassette case 31 will be described with reference to FIG. 3 and FIG. 4. As shown in FIG. 3, a tape area 400 and a pin arrangement area 410 are provided inside the cassette case 31. The tape area 400 is an area adjacent to the corner 321 at the rear left of the cassette case 31. The tape area 400 has a substantially circular shape in a plan view and occupies roughly the left half of the cassette case 31. The pin arrangement area 410 is an area adjacent to the corner 322 at the rear right of the cassette case 31. The pin arrangement area 410 is an area occupying the upper right of the interior of the cassette case 31.

A tape roll 571 around which the half-cut tape 57 is wound is housed in the tape area 400. A plurality of pins 21 is provided in the pin arrangement area 410. An adjustment pin 16 is provided between the tape area 400 and the pin arrangement area 410. In the front-rear direction, the adjustment pin 16 is disposed at the position of the rear end of the tape spool 40. In the left-right direction, the adjustment pin 16 is disposed at the position of the left end of the ribbon winding shaft 95. The adjustment pin 16 extends upward from the bottom plate 306. The length of the adjustment pin 16 in the up-down direction is longer than the length of the half-cut tape 57 in the up-down direction.

Figure 4:
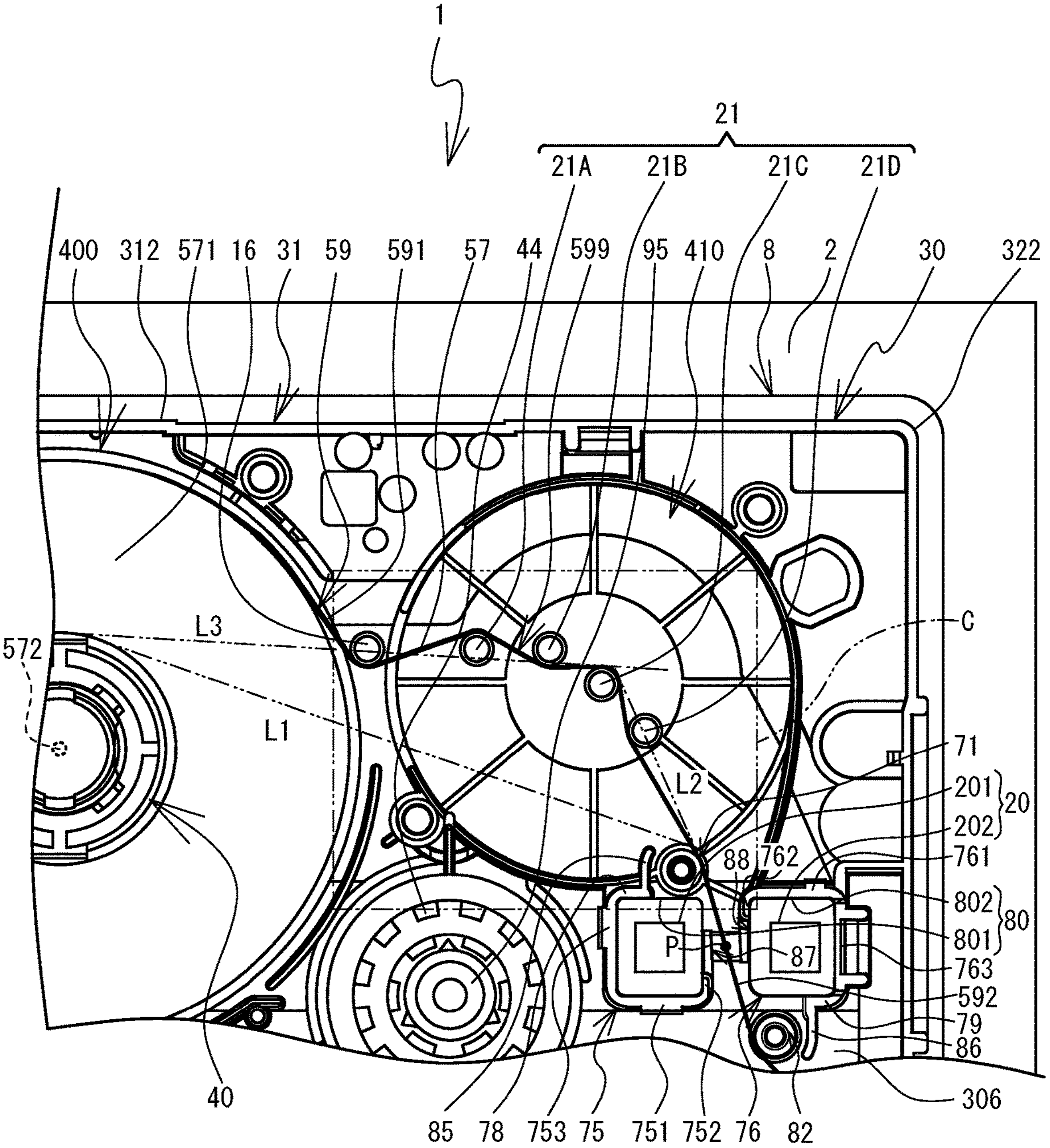
FIG. 4 is a plan view of an upper right portion of the tape cassette.

As shown in FIG. 4, the plurality of pins 21 is provided to the right of the tape spool 40. The plurality of pins 21 is disposed at positions away, to the rear and to the right, from a straight line L1. The straight line L1 is a line connecting the rear end of the tape spool 40 with the rear end of the first rotation body 71.

An N number of the plurality of pins 21 is provided. In the present embodiment, for example, four of the plurality of pins 21 is provided. The plurality of pins 21 is positioned away from each other and extends upward from the bottom plate 306. In the up-down direction, the lengths of the plurality of pins 21 is longer than the length of the half-cut tape 57. The shape of each of the plurality of pins 21 is the same.

The plurality of pins 21 includes a first pin 21A, a second pin 21B, a third pin 21C, and a fourth pin 21D. In the front-rear direction, the first pin 21A is disposed at the position of the rear end of the tape spool 40. In the left-right direction, the first pin 21A is disposed at a center portion of the ribbon winding shaft 95. The first pin 21A is disposed to the right of the adjustment pin 16. In other words, the first pin 21A and the adjustment pin 16 are disposed so as to be aligned in the left-right direction. Among the plurality of pins 21, the first pin 21A is the closest pin to the tape spool 40.

The second pin 21B is disposed to the right of the first pin 21A. In other words, the first pin 21A and the second pin 21B are disposed so as to be aligned in the left-right direction. Among the plurality of pins 21, the second pin 21B is the second closest pin to the tape spool 40. A line connecting the tape spool 40 with the second pin 21B will be referred to as a straight line L3. Here, the first pin 21A is disposed at a position in tangent with the straight line L3.

The third pin 21C is disposed to the right and to the front of the second pin 21B. In the front-rear direction, the third pin 21C is disposed between the front end of the tape spool 40 and a center portion of the tape spool 40. In the left-right direction, the third pin 21C is disposed at the position of the left end of the opening 801. Among the four pins, the third pin 21C is the second closest pin to the first rotation body 71.

The fourth pin 21D is disposed to the right and to the front of the third pin 21C. In the front-rear direction, the fourth pin 21D is disposed at the position of a winding center 572 of the tape spool 40. In the left-right direction, the fourth pin 21D is provided at the position of a center portion of the opening 801. Among the four pins 21A to 21D, the fourth pin 21D is disposed at a position closest to the first rotation body 71. The fourth pin 21D is disposed at a position in tangent with a straight line L2 connecting the third pin 21C with the first rotation body 71.

As shown in FIG. 4, the first rotation body 71 is provided further to the right and to the front than a winding center 572 of the tape roll 571. The first rotation body 71, which is the entrance to the detection position P, is disposed to the rear of the opening 801. The first rotation body 71 faces the opening 801 in the front-rear direction. In the front-rear direction, a distance between the first rotation body 71 and the opening 801 is shorter than a diameter of the first rotation body 71.

The first rotation body 71 has a circular cylindrical shape. The first rotation body 71 is provided with a support shaft 712 and a through hole 711 (refer to FIG. 3). The through hole 711 extends in the up-down direction. The support shaft 712 is inserted into the through hole 711. The length in the up-down direction of the first rotation body 71 is longer than an length in the up-down direction of the half-cut tape 57. A material of the first rotation body 71 is ABS resin, for example.

The first rotation body 71 forms the conveyance path 59 of the half-cut tape 57 pulled out from the tape roll 571. The first rotation body 71 can be driven to rotate in the clockwise direction in a plan view, in accordance with the conveyance of the half-cut tape 57. The first rotation body 71 guides the tape fed out from the tape roll 571 toward a second rotation body 82 to be described later, via the detection position P.

The first regulating portion 75 is provided to the front of the first rotation body 71. The first regulating portion 75 includes walls 751, 752, 753, and 78, and an extension wall 85. The wall 751 is disposed to the front of the first rotation body 71. In the front-rear direction, the wall 751 is disposed at a central portion of the ribbon winding spool 44. In the left-right direction, the wall 751 is disposed at a position of the first rotation body 71. The wall 751 extends in the left-right direction.

The wall 752 extends to the rear from the right end of the wall 751. The rear end of the wall 752 is further to the front than the center, in the front-rear direction, of the opening 801. The wall 752 is disposed to a left surface side of the tape at the detection position P, and extends along a tape conveyance direction.

The wall 753 extends upward from the left end of the wall 751. The upper end of the wall 753 is substantially at the same position, in the front-rear direction, as the position of the front end of the first rotation body 71. The wall 78 extends to the right from the rear end of the wall 753. The length of the wall 78 in the left-right direction is substantially half the length of the wall 751 in the left-right direction. The extension wall 85 extends to the rear from the right end of the wall 78. In this case, the extension wall 85 extends along the first rotation body 71 at the left of the first rotation body 71. In other words, the extension wall 85 is curved along the first rotation body 71. The first rotation body 71 is supported by the extension wall 85.

A first opening 87 is defined by the first regulating portion 75 and the first rotation body 71. The first opening 87 opens toward the left surface of the tape conveyed through the detection position P. Further, the opening 801 is defined by the first regulating portion 75 and the first rotation body 71.

The second regulating portion 76 is provided to the right of the first regulating portion 75, via the conveyance path 59 of the tape. The second regulating portion 76 faces the first regulating portion 75 in the left-right direction. The second regulating portion 76 includes walls 761, 762, 763, and 79, and an extension wall 86. The wall 761 is disposed at the same position as the position of the wall 78 in the front-rear direction. The wall 761 extends in the left-right direction.

The wall 762 extends to the front from the left end of the wall 761. The front end of the wall 762 is disposed further to the rear than the center, in the front-rear direction, of the opening 802. The wall 762 is disposed to the right surface side of the tape at the detection position P, and extends along the tape conveyance direction.

The wall 763 extends to the front from the right end of the wall 761. The length of the wall 763 in the front-rear direction is the same as the length of the wall 753 in the front-rear direction. The wall 79 extends to the left from the front end of the wall 763. The length of the wall 79 in the left-right direction is substantially half the length of the wall 761 in the left-right direction. The extension wall 86 extends to the front from the left end of the wall 79. In this case, the extension wall 86 extends along the second rotation body 82 at the right of the second rotation body 82 to be described later. The extension wall 86 is curved along the second rotation body 82.

A second opening 88 is configured by the second regulating portion 76 and the second rotation body 82. The second opening 88 opens toward the right surface of the tape that is opposite to the left surface of the tape. Further, the opening 802 is defined by the second regulating portion 76 and the second rotation body 82.

The second rotation body 82 is disposed to the front of the opening 802, and to the left of the extension wall 86, which is a position adjacent to the exit from the detection position P. The second rotation body 82 is supported by the extension wall 86 at the left of the extension wall 86. The second rotation body 82 has a circular cylindrical shape. The second rotation body 82 is provided with a support shaft 822 and a through hole 821. The through hole 821 extends in the up-down direction. The support shaft 822 is inserted into the through hole 821. The length of the second rotation body 82 in the up-down direction is longer than the length of the half-cut tape 57 in the up-down direction. The diameter of the second rotation body 82 is the same as the diameter of the first rotation body 71. A material of the second rotation body 82 is ABS resin, for example.

The second rotation body 82 forms the conveyance path 59 of the half-cut tape 57 pulled out from the tape roll 571. The second rotation body 82 is in contact with the half-cut tape 57 from the right. The second rotation body 82 can be driven to rotate in the counter-clockwise direction in a plan view in accordance with the conveyance of the half-cut tape 57. In this way, the second rotation body 82 causes the conveyance path 59 of the tape to be curved, and guides the tape to a third rotation body 81.

The third rotation body 81 is disposed to the front of the opening 802 and to the left of the extension wall 86. The third rotation body 81 is disposed at a position of the rear end of the ribbon spool 42 in the front-rear direction. The third rotation body 81 is disposed at the position of the opening 802 in the left-right direction. In other words, in the tape conveyance direction, the third rotation body 81 is disposed downstream of the second rotation body 82 and upstream of a fourth rotation body 72. The third rotation body 81 has a circular cylindrical shape.

The third rotation body 81 is provided with a support shaft 813 and a through hole 814. The through hole 814 extends in the up-down direction. The support shaft 813 is inserted into the through hole 814. The length in the up-down direction of the third rotation body 81 is shorter than the length of the half-cut tape 57 in the up-down direction. The diameter of the third rotation body 81 is larger than the diameters of the first rotation body 71 and the second rotation body 82. A material of the third rotation body 81 is ABS resin, for example.

The third rotation body 81 forms the conveyance path 59 of the half-cut tape 57 pulled out from the tape roll 571. The third rotation body 81 is contact, from the left, with the tape that has been conveyed through the detection position P. The third rotation body 81 can be driven to rotate in the clockwise direction in a plan view in accordance with the conveyance of the half-cut tape 57. In this way, the third rotation body 81 causes the conveyance path 59 of the tape to be curved, and guides the tape to the fourth rotation body 72.

The fourth rotation body 72 is disposed to the left of the third rotation body 81 and to the rear of the front surface wall 32. The fourth rotation body 72 has a circular cylindrical shape. The fourth rotation body 72 is provided with a support shaft 722 and a through hole 721. The through hole 721 extends in the up-down direction. The support shaft 722 is inserted into the through hole 721. The length of the fourth rotation body 72 in the up-down direction is shorter than the length of the half-cut tape 57 in the up-down direction. The diameter of the fourth rotation body 72 is the same as the diameter of the third rotation body 81. A material of the fourth rotation body 72 is ABS resin, for example.

The fourth rotation body 72 forms the conveyance path 59 of the half-cut tape 57 pulled out from the tape roll 571. The fourth rotation body 72 is contact with the half-cut tape 57 from the rear left. The fourth rotation body 72 can be driven to rotate in the clockwise direction in a plan view in accordance with the conveyance of the half-cut tape 57. In this way, the fourth rotation body 72 causes the conveyance path 59 of the tape to be curved, and guides the half-cut tape 57 to the arm 34.

A guide portion 33 is provided at a left end of the arm 34. The guide portion 33 extends in the up-down direction. Protrusions 331 that protrude to the front are provided at ends of the guide portion 33 in the up-down direction. The half-cut tape 57 is disposed between the upper and lower protrusions 331. The half-cut tape 57 comes into contact with the guide portion 33 and is guided. The guide portion 33 guides the half-cut tape 57 to the discharge outlet 341.

The ribbon spool 42 is positioned to the right of the head insertion portion 39. The ink ribbon 60 is wound around the ribbon spool 42. The unused ink ribbon 60 is wound around the ribbon spool 42. The ink ribbon 60 is used for printing on the half-cut tape 57. The ink ribbon 60 faces the opening 801 in the front-rear direction.

The ribbon winding spool 44 is provided further to the rear and to the left than the ribbon spool 42. The ribbon winding spool 44 is provided between the tape area 400 and the ribbon spool 42. The ribbon winding spool 44 winds the ink ribbon 60 after the ink ribbon 60 has been used for the printing.

The separator portion 61 is provided to the left of the head insertion portion 39. The separator portion 61 separates the half-cut tape 57 and the ink ribbon 60 used for the printing at a position downstream of the exposure portion 77 in the tape conveyance direction. The separator portion 61 includes regulating members 361 and 362 (refer to FIG. 2), a ribbon guide wall 38, and the like.

The tape drive roller 46 is axially supported so as to be able to rotate (refer to FIG. 2) at the left of the separator portion 61. The front surface of the tape drive roller 46 is exposed to the outside of the cassette case 31, and is in contact with the half-cut tape 57.

The discharge guide portion 49 is provided downstream of the tape drive roller 46 in the conveyance direction. The discharge guide portion 49 is provided slightly separated, to the front, from the front end of the left surface of the tape cassette 30. The discharge guide portion 49 is a plate-shaped member extending between the top surface 301 and the bottom surface 302 of the cassette case 31. The discharge guide portion 49 discharges the printed tape 50 conveyed via the tape drive roller 46, to the outside of the tape cassette 30.

The conveyance path 59 will be described with reference to FIG. 3 and FIG. 4. The conveyance path 59 is configured by a conveyance path 591, a conveyance path 599, and conveyance paths 592 to 595. Note that the conveyance path 59 is an ideal path through which the undeflected half-cut tape 57 is conveyed. Further, in the conveyance from the tape roll 571 to the plurality of pins 21, the tape is conveyed via the adjustment pin 16.

The conveyance path 591 is a path from the tape roll 571 to the adjustment pin 16. The conveyance path 599 is a path from the adjustment pin 16 to the first rotation body 71. The conveyance path 599 will be described later. The conveyance path 592 is a path from the first rotation body 71 to the second rotation body 82. The conveyance path 593 is a path from the second rotation body 82 to the third rotation body 81. The conveyance path 594 is a path from the third rotation body 81 to the fourth rotation body 72. The conveyance path 595 is a path from the fourth rotation body 72 to the guide portion 33.

Figure 5A:
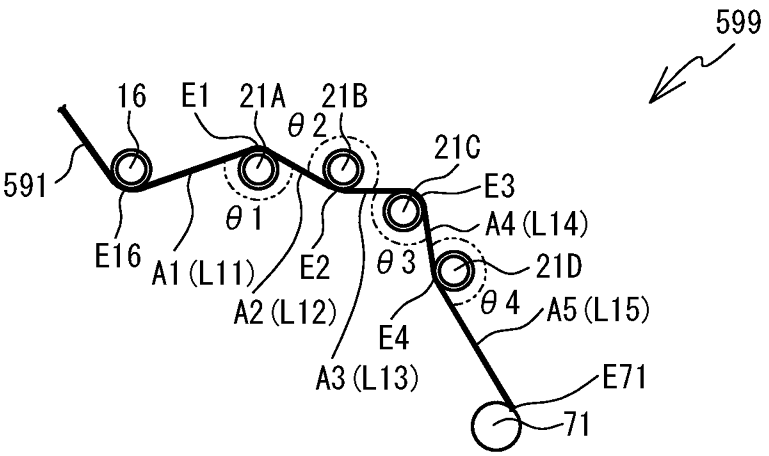
FIG. 5A to FIG. 5D are views showing conveyance paths in an area C.

A plurality of the conveyance paths 599 passing via the plurality of pins 21 will be described with reference to FIG. 5. As shown in FIG. 5A, the conveyance path 599 is a path that passes via the first pin 21A to the fourth pin 21D. The conveyance path 599 is configured by paths A1 to A5. The path A1 is a path between a front end E16 of the adjustment pin 16 and an end E1 of the first pin 21A. The path A2 is a path between the end E1 of the first pin 21A and an end E2 of the second pin 21B. The path A3 is a path between the end E2 of the second pin 21B and an end E3 of the third pin 21C. The path A4 is a path between the end E3 of the third pin 21C and an end E4 of the fourth pin 21D. The path A5 is a path between the end E4 of the fourth pin 21D and a rear right end E71 of the first rotation body 71.

Figure 5B:
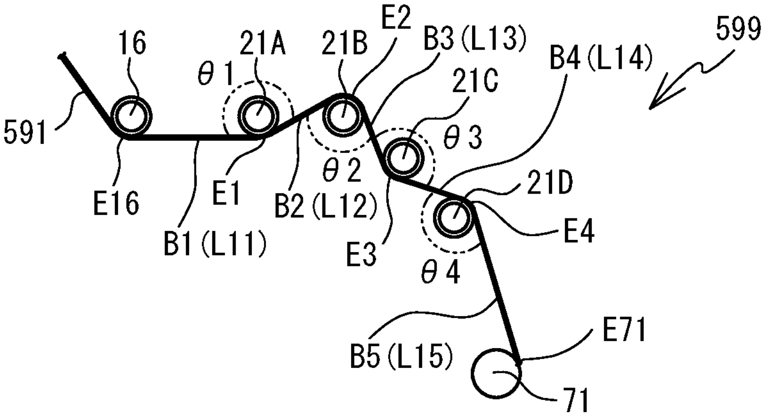

As shown in FIG. 5B, the conveyance path 599 is the path that passes via the first pin 21A to the fourth pin 21D. The conveyance path 599 is configured by paths B1 to B5. The path B1 is a path between the front end E16 of the adjustment pin 16 and the end E1 of the first pin 21A. The path B2 is a path between the end E1 of the first pin 21A and the end E2 of the second pin 21B. The path B3 is a path between the end E2 of the second pin 21B and the end E3 of the third pin 21C. The path B4 is a path between the end E3 of the third pin 21C and the end E4 of the fourth pin 21D. The path B5 is a path between the end E4 of the fourth pin 21D and the rear right end E71 of the first rotation body 71.

Figure 5C:
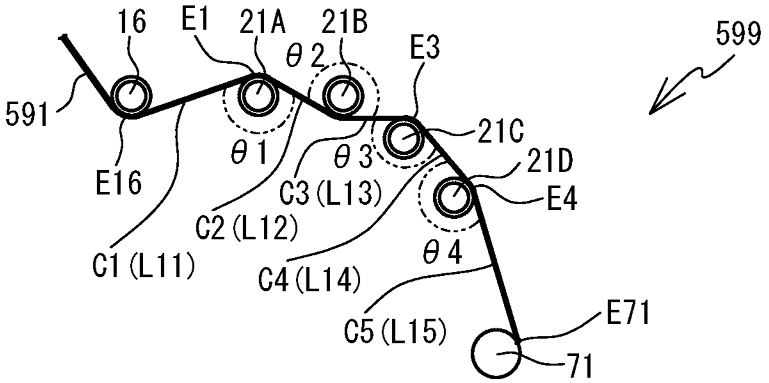

As shown in FIG. 5C, the conveyance path 599 is the path that passes via the first pin 21A to the fourth pin 21D. The conveyance path 599 is configured by paths C1 to C5. The path C1 is a path between the front end E16 of the adjustment pin 16 and the end E1 of the first pin 21A. The path C2 is a path between the end E1 of the first pin 21A and the end E2 of the second pin 21B. The path C3 is a path between the end E2 of the second pin 21B and the end E3 of the third pin 21C. The path C4 is a path between the end E3 of the third pin 21C and the end E4 of the fourth pin 21D. The path C5 is a path between the end E4 of the fourth pin 21D and the rear right end E71 of the first rotation body 71.

Figure 5D:
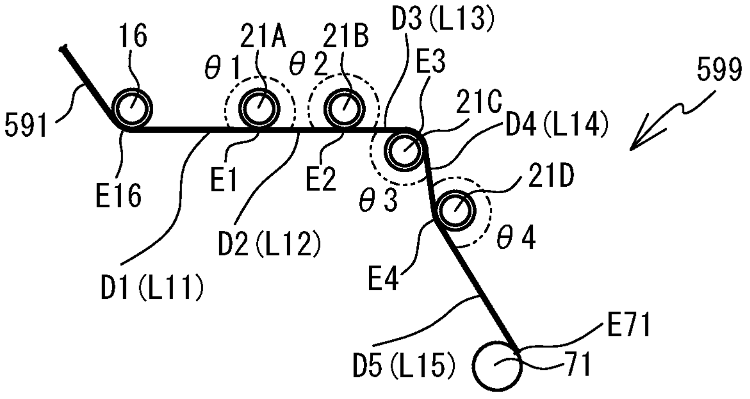

As shown in FIG. 5D, the conveyance path 599 is the path that passes via the first pin 21A to the fourth pin 21D. The conveyance path 599 is configured by paths D1 to D5. The path D1 is a path between the front end E16 of the adjustment pin 16 and the end E1 of the first pin 21A. The path D2 is a path between the end E1 of the first pin 21A and the end E2 of the second pin 21B. The path D3 is a path between the end E2 of the second pin 21B and the end E3 of the third pin 21C. The path D4 is a path between the end E3 of the third pin 21C and the end E4 of the fourth pin 21D. The path D5 is a path between the end E4 of the fourth pin 21D and the rear right end E71 of the first rotation body 71. The paths D1 to D5 are straight lines.

In the paths shown in FIG. 5A to FIG. 5D, the half-cut tape 57 can come into contact, in order, with the first pin 21A, the second pin 21B, the third pin 21C, and the fourth pin 21D, from the tape roll 571 toward the first rotation body 71. Here, a straight line connecting the adjustment pin 16 with the first pin 21A will be referred to as a straight line L11. A straight line connecting the first pin 21A with the second pin 21B will be referred to as a straight line L12. A straight line connecting the second pin 21B with the third pin 21C will be referred to as a straight line L13. A straight line connecting the third pin 21C with the fourth pin 21D will be referred to as a straight line L14. A straight line connecting the fourth pin 21D with the first rotation body 71 will be referred to as a straight line L15.

In this case, an angle θ1 between the straight line L11 and the straight line L12 is greater than 105 degrees. An angle θ2 between the straight line L12 and the straight line L13 is greater than 105 degrees. An angle θ3 between the straight line L13 and the straight line L14 is greater than 105 degrees. An angle θ4 between the straight line L14 and the straight line L15 is greater than 105 degrees.

A manufacturer selects the path, which differs depending on the type of the tape, on the basis of the thickness of the medium of the half-cut tape 57, the rigidity of the half-cut tape 57, and the like. For example, the manufacturer selects the conveyance path 599 shown in FIG. 5A and mounts the half-cut tape 57 in the interior of the tape cassette 30.

A case will be described in which the printing is performed on the half-cut tape 57 by the printer 1. As shown in FIG. 2 to FIG. 4, the half-cut type tape cassette 30 is mounted in the cassette housing 8. In this case, the sensors 201 and 202 are disposed on the inside of the openings 801 and 802. The tape drive roller 46 mounted to the tape drive shaft 100 is rotationally driven by the rotation of the tape drive shaft 100 of the printer 1. The half-cut tape 57 is pulled out from the tape roll 571 by the tape drive roller 46 and the movable feed roller 14 moving in concert with each other. In accordance with the pulling out of the half-cut tape 57, the tape roll 571 rotates in the clockwise direction in a plan view.

The half-cut tape 57 pulled out from the tape roll 571 is conveyed toward the adjustment pin 16 via the conveyance path 591. In this case, the adjustment pin 16 comes into contact with the half-cut tape 57 regardless of a storage amount of the tape roll 571 in the tape area 400. The half-cut tape 57 is conveyed toward the plurality of pins 21 via the adjustment pin 16. The half-cut tape 57 is conveyed toward the first rotation body 71 via the plurality of pins 21. For example, the tape is conveyed by the conveyance path 599 shown in FIG. 5A. The half-cut tape 57 is conveyed along the conveyance path 592 and is conveyed toward the second rotation body 82. The half-cut tape 57 is conveyed along the conveyance path 593 and is conveyed toward the third rotation body 81. The half-cut tape 57 is conveyed along the conveyance path 594 and is conveyed toward the fourth rotation body 72. The half-cut tape 57 is conveyed along the conveyance path 595 and is conveyed toward the arm 34.

On the other hand, the ribbon winding shaft 95 of the printer 1 rotationally drives the ribbon winding spool 44 mounted to the ribbon winding shaft 95. The ribbon winding spool 44 rotates in the counter-clockwise direction in a plan view in accordance with the driving of the ribbon winding shaft 95, and pulls out the ink ribbon 60 from the ribbon spool 42. The ribbon spool 42 rotates in the counter-clockwise direction in a plan view in accordance with the pulling out of the ink ribbon 60. The ink ribbon 60 pulled out from the ribbon spool 42 is conveyed toward the arm 34.

In the arm 34, the half-cut tape 57 is conveyed along the conveyance path 595 that extends substantially in parallel with the arm front surface wall 35. The half-cut tape 57 is bent diagonally to the left and to the rear by the guide portion 33, and is discharged to the exposure portion 77 from the discharge outlet 341. The ink ribbon 60 is conveyed further to the rear than a circular pillar 333, a wall 332, and the guide portion 33 in the arm 34, and is discharged to the exposure portion 77 from the discharge outlet 341 while being overlaid with the half-cut tape 57.

At the exposure portion 77, a release paper of the half-cut tape 57 discharged from the discharge outlet 341 is exposed to the front, and a print surface of the half-cut tape 57 faces the thermal head 10. The thermal head 10 performs the printing on the half-cut tape 57 positioned at the exposure portion 77, using the ink ribbon 60.

The ink ribbon 60 after the printing has been performed is separated from the half-cut tape 57 by the separator portion 61, moves along the ribbon guide wall 38, and is wound by the ribbon winding spool 44. The half-cut tape 57 after the printing has been performed, namely, the printed tape 50, is guided downstream in the tape conveyance direction by the regulating members 361 and 362, and is conveyed toward the discharge guide portion 49 after being conveyed between the tape drive roller 46 and the movable feed roller 14. The printed tape 50 is discharged to the outside from the discharge guide portion 49. In this way, the printer 1 creates the printed tape 50.

As described above, the plurality of pins 21 is disposed at the positions away from the straight line L1 connecting the tape spool 40 with the first rotation body 71. The pins 21 cause the conveyance path 59 from the tape roll 571 to the first rotation body 71 to be curved, and guide the tape to the first rotation body 71 along the conveyance path.

The tape cassette 30 causes the conveyance path 59 of the tape to be curved, using the plurality of pins 21. In this way, the tape fed out from the tape roll 571 is conveyed to the detection position P via the plurality of pins 21. Thus, the tape cassette 30 can convey the tape in a stable manner. Furthermore, the tape cassette 30 can perform detection of the tape information by the sensor 20 in a stable manner. Further, using the plurality of pins 21, the tape cassette 30 can configure the plurality of mutually different conveyance paths 599. Thus, when the tapes having different characteristics are housed, the tape cassette 30 can convey the tape using the conveyance path 599 suited to those characteristics. In this way, in the tape cassette 30, a pulling out force of the tape when the tape is conveyed is stable.

In FIG. 5A to FIG. 5D, the angle θ1 to the angle θ4 are greater than 105 degrees. In this case, in the tape cassette 30, the angles θ1 to θ4 are the obtuse angles greater than 105 degrees. In this way, the tape cassette 30 can reduce a pulling load for pulling the tape when the tape is conveyed.

The fourth pin 21D is disposed at the position closest to the first rotation body 71, and is disposed at the position in tangent with the straight line L2 connecting the third pin 21C with the first rotation body 71. In this case, the tape cassette 30 can convey the tape to the first rotation body 71 in the stable manner.

The first pin 21A is the closest pin to the tape spool 40. The second pin 21B is the second closest pin to the tape spool 40. The first pin 21A is disposed at the position in tangent with the straight line L3 connecting the tape spool 40 with the second pin 21B. In this case, using the first pin 21A, the tape cassette 30 can cause the conveyance path 59 of the tape from the tape roll 571 to the second pin 21B to be curved. In this way, the tape cassette 30 can convey the tape in the stable manner.

The first pin 21A is aligned with the second pin 21B. In this case, the tape cassette 30 can configure the plurality of conveyance paths 599 using a simple pin arrangement.

The number of the plurality of pins 21 is four. The tape cassette 30 can configure the plurality of conveyance paths 599 using the four pins.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

A tape cassette 30A according to a first modified example will be described with reference to FIG. 6 and FIG. 7. In the description of the first modified example, the same reference sign will be assigned to a configuration having the same function as that of the above-described embodiment, and a description thereof will be omitted or simplified. The tape cassette 30A according to the first modified example differs from the above-described embodiment in being provided with a plurality of pins 211 in place of the plurality of pins 21. Note that a number of the pins is three (N=3). A plurality of conveyance paths 599A are configured using the plurality of pins 211.

Figure 6:
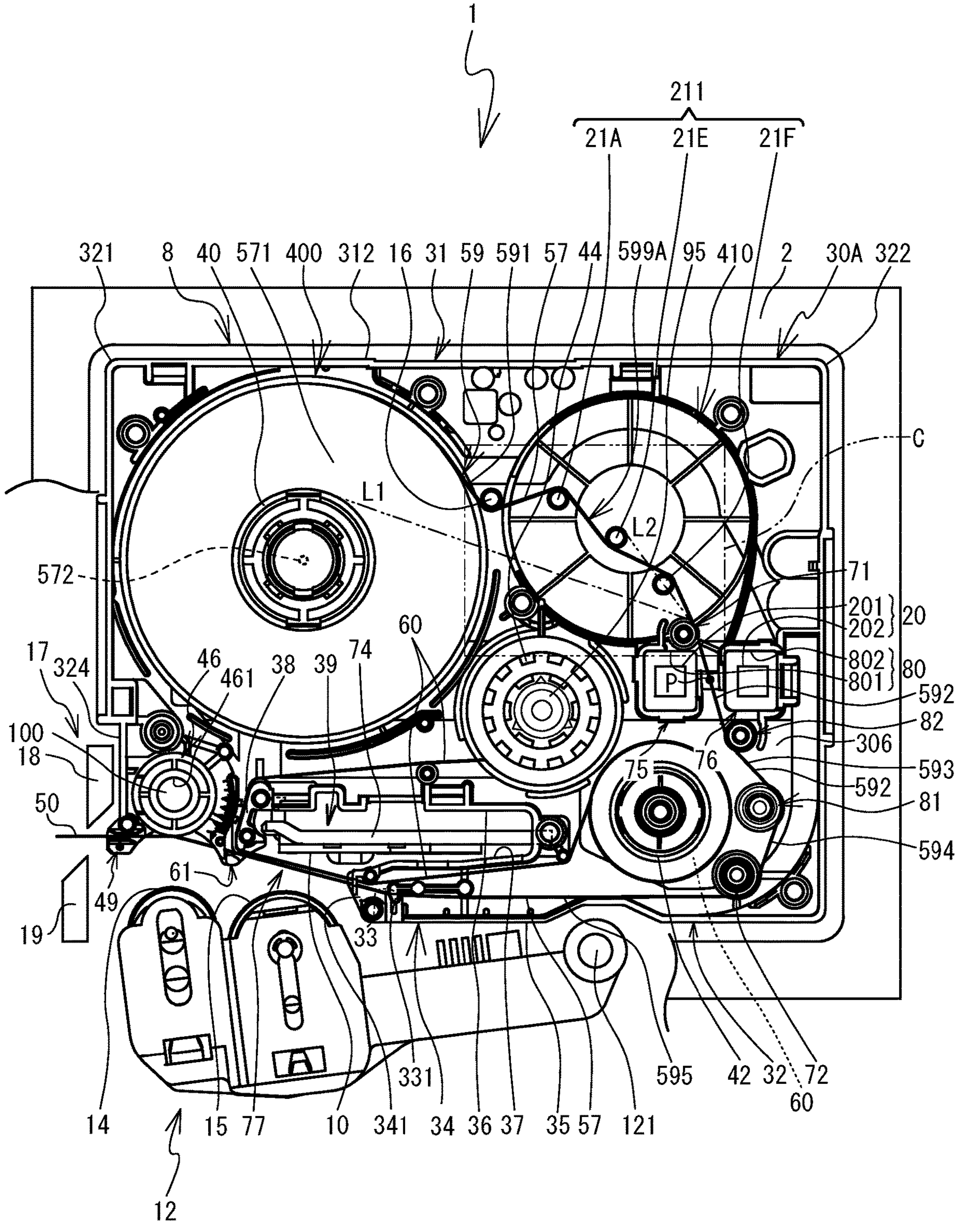
FIG. 6 is a view for illustrating pins.

As shown in FIG. 6, the plurality of pins 211 includes the first pin 21A, a fifth pin 21E, and a sixth pin 21F. The first pin 21A is the same as that of the above-described embodiment. The fifth pin 21E is disposed between the first pin 21A and the first rotation body 71. The fifth pin 21E is disposed at a position between the winding center 572 of the tape spool 40 and the rear end of the tape spool 40 in the front-rear direction. The fifth pin 21E is disposed at the position of the right end of the ribbon winding spool 44 in the left-right direction.

The sixth pin 21F is disposed at a position between the fifth pin 21E and the first rotation body 71. In the front-rear direction, the sixth pin 21F is disposed at a position between the winding center 572 of the tape spool 40 and the front end of the tape spool 40. In the left-right direction, the sixth pin 21F is disposed at the position of a winding center of the ink ribbon 60.

Figure 7A:
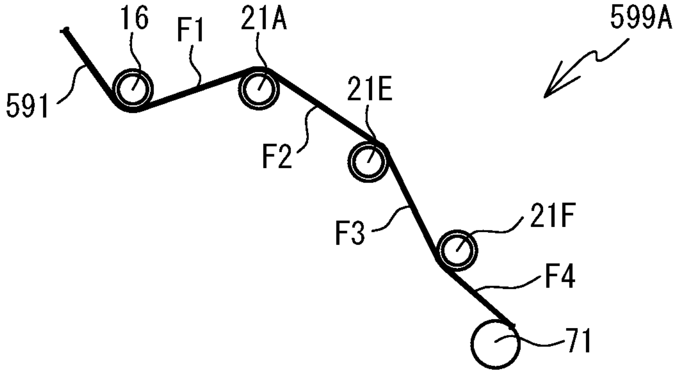
FIG. 7A to FIG. 7C are views showing conveyance paths in the area C.

As shown in FIG. 7A, the conveyance path 599A is configured by paths F1 to F4. The path F1 is a path from the adjustment pin 16 to the first pin 21A. The path F2 is a path from the first pin 21A to the fifth pin 21E. The path F3 is a path from the fifth pin 21E to the sixth pin 21F. The path F4 is a path from the sixth pin 21F to the first rotation body 71. In this way, the manufacturer can select the path passing through all the pins, among the plurality of pins 211.

Figure 7B:
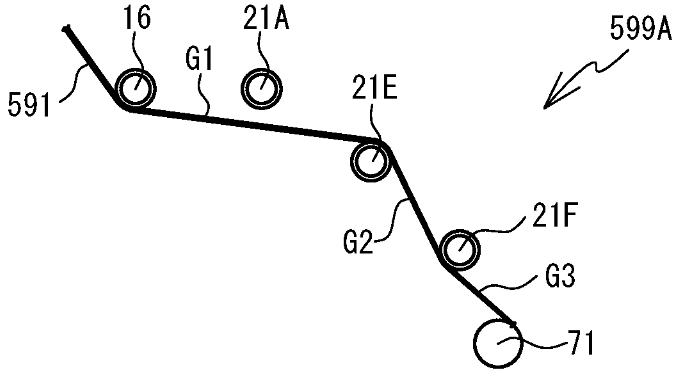

As shown in FIG. 7B, the conveyance path 599A is configured by paths G1 to G3. The path G1 is a path from the adjustment pin 16 to the fifth pin 21E. The path G2 is a path from the fifth pin 21E to the sixth pin 21F. The path G3 is a path from the sixth pin 21F to the first rotation body 71. In this way, the manufacturer can select the path not using the first pin 21A, among the plurality of pins 211.

Figure 7C:
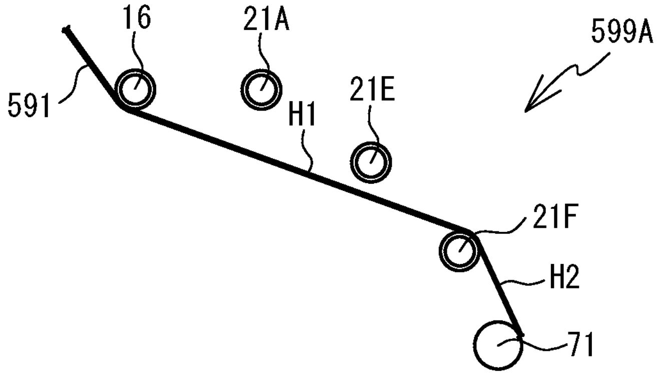

As shown in FIG. 7C, the conveyance path 599A is configured by paths H1 and H2. The path H1 is a path from the adjustment pin 16 to the sixth pin 21F. The path H2 is a path from the sixth pin 21F to the first rotation body 71. In this way, the manufacturer can select the path not using the first pin 21A and the fifth pin 21E, among the plurality of pins 211.

Note that the tape cassette 30A according to the first modified example can also convey the tape using paths other than the paths described above. It is sufficient that the manufacturer select the pins to be used as appropriate, among the plurality of pins 211.

A tape cassette 30B according to a second modified example will be described with reference to FIG. 8 and FIG. 9. In the description of the second modified example, the same reference sign will be assigned to a configuration having the same function as that of the above-described embodiment, and a description thereof will be omitted or simplified. The tape cassette 30B according to the second modified example differs from the above-described embodiment in being provided with a plurality of pins 212 in place of the plurality of pins 21. Note that a number of the pins is five (N=5). A plurality of conveyance paths 599B is configured using the plurality of pins 212.

Figure 8:
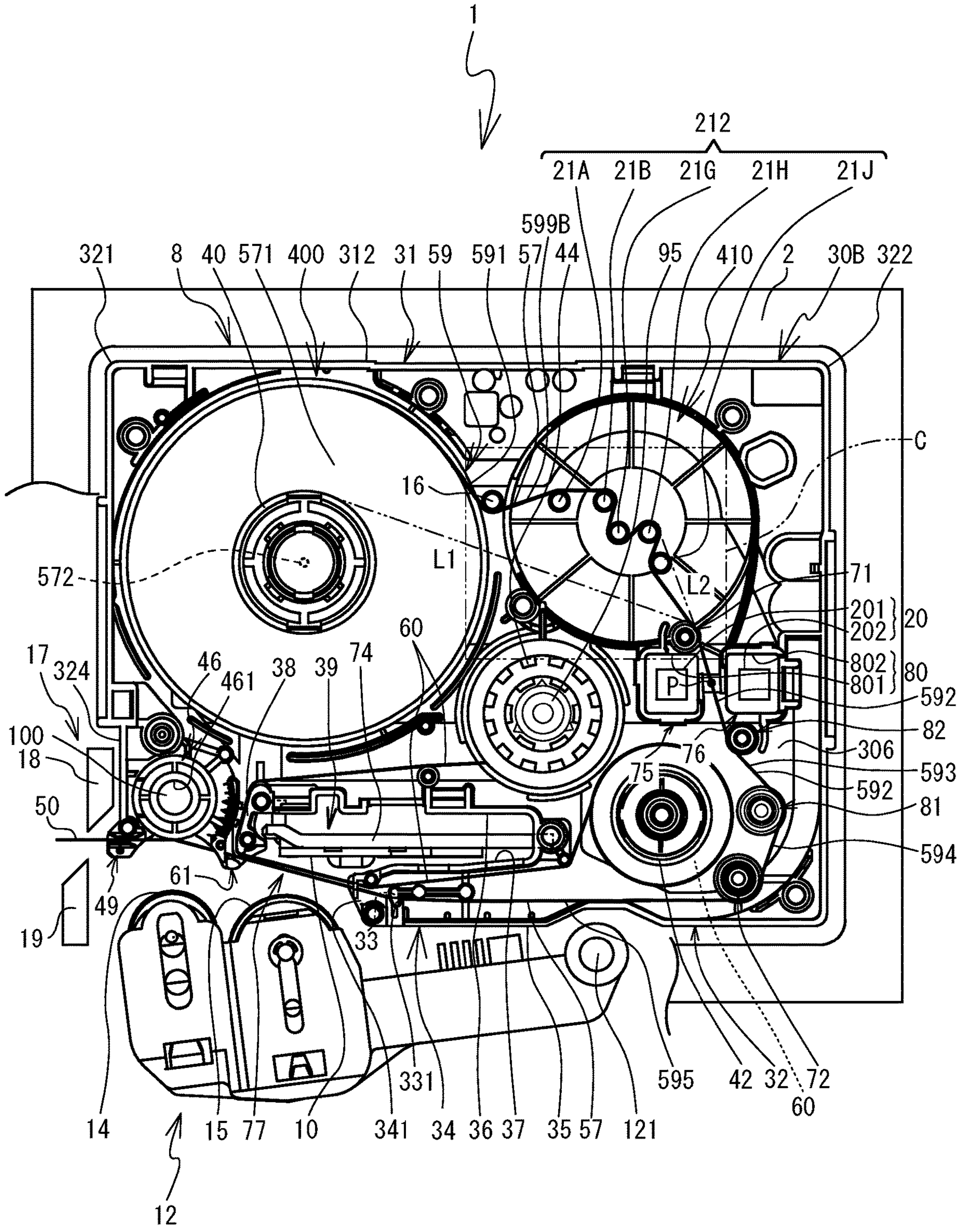
FIG. 8 is a view for illustrating pins.

As shown in FIG. 8, the plurality of pins 212 includes the first pin 21A, the second pin 21B, a seventh pin 21G, an eighth pin 21H, and a ninth pin 21J. The first pin 21A and the second pin 21B are the same as those of the above-described embodiment. The seventh pin 21G is disposed at a position between the first pin 21A and the first rotation body 71. In the front-rear direction, the seventh pin 21G is disposed at a position between the winding center 572 of the tape spool 40 and the rear end of the tape spool 40. In the left-right direction, the seventh pin 21G is disposed at the position of the right end of the ribbon winding spool 44.

The eighth pin 21H is disposed to the right of the seventh pin 21G. The eighth pin 21H is aligned with the seventh pin 21G to the left and the right. The ninth pin 21J is disposed to the right and to the front of the eighth pin 21H. The ninth pin 21J is disposed between the eighth pin 21H and the first rotation body 71. In the front-rear direction, the ninth pin 21J is disposed at the position of the winding center 572 of the tape spool 40. In the left-right direction, the ninth pin 21J is disposed at the position of the center portion of the opening 801.

Figure 9A:
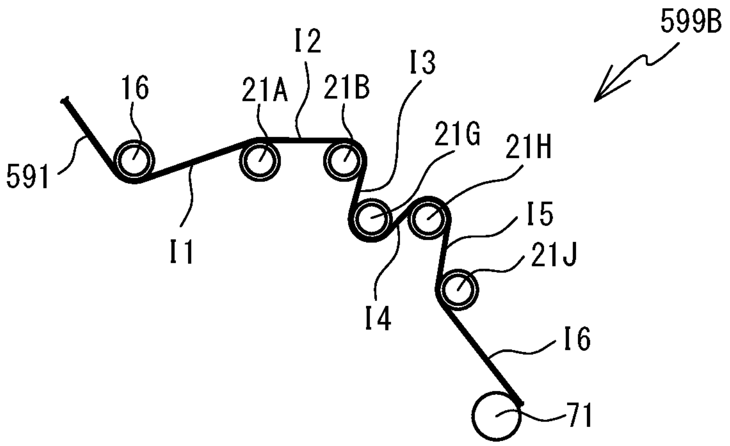
FIG. 9A to FIG. 9C are views showing conveyance paths in the area C.

As shown in FIG. 9A, the conveyance path 599B is configured by paths I1 to I6. The path I1 is a path from the adjustment pin 16 to the first pin 21A. The path I2 is a path from the first pin 21A to the second pin 21B. The path I3 is a path from the second pin 21B to the seventh pin 21G. The path I4 is a path from the seventh pin 21G to the eighth pin 21H. The path I5 is a path from the eighth pin 21H to the ninth pin 21J. The path I6 is a path from the ninth pin 21J to the first rotation body 71. In this way, the manufacturer can select the path passing through all the pins, among the plurality of pins 212.

Figure 9B:
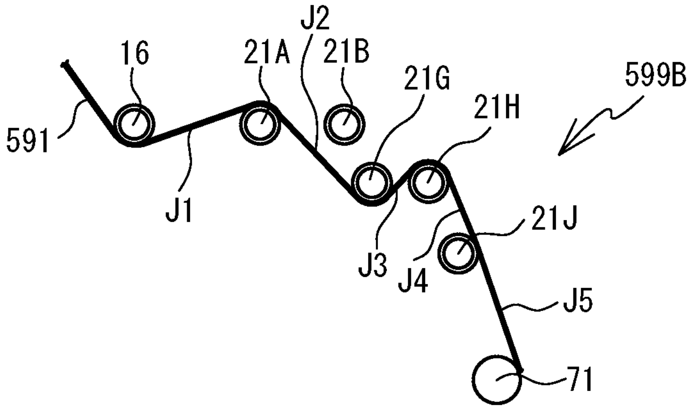

As shown in FIG. 9B, the conveyance path 599B is configured by paths J1 to J5. The path J1 is a path from the adjustment pin 16 to the first pin 21A. The path J2 is a path from the first pin 21A to the seventh pin 21G. The path J3 is a path from the seventh pin 21G to the eighth pin 21H. The path J4 is a path from the eighth pin 21H to the ninth pin 21J. The path J5 is a path from the ninth pin 21J to the first rotation body 71. In this way, the manufacturer can select the path not using the second pin 21B, among the plurality of pins 212.

Figure 9C:
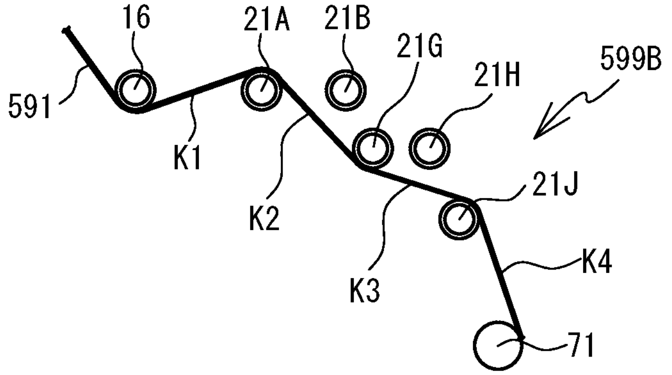

As shown in FIG. 9C, the conveyance path 599B is configured by paths K1 to K4. The path K1 is a path from the adjustment pin 16 to the first pin 21A. The path K2 is a path from the first pin 21A to the seventh pin 21G. The path K3 is a path from the seventh pin 21G to the ninth pin 21J. The path K4 is a path from the ninth pin 21J to the first rotation body 71. In this way, the manufacturer can select the path not using the second pin 21B and the eighth pin 21H, among the plurality of pins 212.

Note that the tape cassette 30B according to the second modified example can also convey the tape using paths other than the paths described above. It is sufficient that the manufacturer select the pins to be used as appropriate, among the plurality of pins 212.

Various changes can be further made to the above-described embodiment, as described below. In the tape cassette 30 of the above-described embodiment, the half-cut tape 57 is conveyed, but the tape cassette 30 is not limited to this configuration. The tape cassette 30 may be a thermal type cassette or the like. For example, the tape may have a tube shape. In this case, the tape may be contracted using heat.

In the above-described embodiment, the tape is conveyed by the conveyance path 59, but the configuration is not limited to this example. For example, the half-cut tape 57 may be conveyed without being conveyed through the second rotation body 82 and the third rotation body 81 of the conveyance path 59.

In the above-described embodiment, the tape is conveyed via the adjustment pin 16 but the configuration is not limited to this example. For example, the adjustment pin 16 may be omitted. In this case, the tape cassette 30 may be configured to be able to convey the tape from the tape roll 571 to the plurality of pins 21.

In the above-described embodiment, the conveyance path 599 is configured by the conveyance paths 599 shown in FIG. 5A to FIG. 5D, but the configuration is not limited to these examples. For example, the manufacturer may change the path as appropriate. For example, a path may be configured that passes through at least one of the plurality of pins 21. The manufacturer may select the pin as appropriate from among the plurality of pins 21.

In the above-described embodiment, an example is described in which N=4, but the configuration is not limited to this example. For example, N may be an integer of three or less, or may be an integer of five or more. For example, when a number of the plurality of pins 21 is N (where N is an integer equal to or greater than three), the tape may be conveyed from the tape roll 571 toward the first rotation body 71 while being able to come into contact with the first pin 21A, . . . an (N−1)th pin, and an Nth pin in order.

An angle between an (n−1)th straight line and a nth straight line may be greater than 105 degrees, where, n is an integer from 2 to N−1, the (n−1)th straight line connects an (n−1)th pin with an nth pin, and an nth straight line connects the nth pin with an (n+1)th pin.

In the above-described embodiment, the fourth pin 21D is disposed at a position in tangent with the straight line L2, but the configuration is not limited to this example. For example, a center portion of the fourth pin 21D may be disposed at a position away from the straight line L2 connecting the eighth pin 21H with the first rotation body 71. In this case, the tape cassette 30 can convey the tape to the first rotation body 71 in the stable manner.

In the above-described embodiment, the plurality of pins 21 is disposed at the positions shown in FIG. 2 to FIG. 5, but the configuration is not limited to these examples. The arrangement of the plurality of pins 21 may be changed as appropriate.

In the above-described embodiment, the shape of each of the plurality of pins 21 is the same, but the configuration is not limited to this example. For example, the plurality of pins 21 may have different shapes, respectively. The length in the up-down direction of the plurality of pins 21 is longer than the length of the half-cut tape 57 in the up-down direction, but the configuration is not limited to this example. For example, the length of the plurality of pins 21 in the up-down direction may be the same as or shorter than the length of the half-cut tape 57 in the up-down direction.

In the above-described embodiment, the first rotation body 71, the second rotation body 82, the third rotation body 81, and the fourth rotation body 72 are able to rotate, but the configuration is not limited to this example. For example, at least one of the first rotation body 71, the second rotation body 82, the third rotation body 81, and the fourth rotation body 72 may be a pin.

In the above-described embodiment, the lengths in the up-down direction of the first rotation body 71 and the second rotation body 82 are longer than the length of the half-cut tape 57 in the up-down direction, but the configuration is not limited to this example. For example, the lengths in the up-down direction of the first rotation body 71 and the second rotation body 82 may be the same as, or shorter than the length of the half-cut tape 57 in the up-down direction.

The lengths in the up-down direction of the third rotation body 81 and the fourth rotation body 72 are shorter than the length of the half-cut tape 57 in the up-down direction, but the configuration is not limited to this example. For example, the lengths in the up-down direction of the third rotation body 81 and the fourth rotation body 72 may be the same as, or longer than the length of the half-cut tape 57 in the up-down direction.

In the above-described embodiment, the angles θ1 to θ4 are set to be equal to or greater than 105 degrees, but may be an angle other than this. For example, the angles θ1 to θ4 may be set to be equal to or less than 105 degrees.

What is claimed is:

1. A tape cassette configured to be mounted in a printer, the tape cassette comprising:
- a housing having an outlet;
- a tape spool held inside the housing;
- a tape wound around the tape spool, the tape including a print surface and an opposite surface that is opposite to the print surface;
- a first guide configured to guide the tape toward a detection position where tape information of the tape is detected by a sensor of the printer;
- a second guide configured to guide the tape that has been conveyed through the detection position toward the outlet; and
- a plurality of pins disposed at positions away from a straight line connecting the tape spool with the first guide, a conveyance path of the tape from the tape spool to the first guide is formed by contacting one of pins with the print surface of the tape and another one of the pins with the opposite surface of the tape.

2. The tape cassette according to claim 1, wherein
- a number of the plurality of pins is N where N is an integer equal to or greater than three,
- the tape is in contact with the N pins in order while the tape is guided along the conveyance path, and
- an angle between an (n−1)th straight line and an nth straight line is greater than 105 degrees, where n is an integer from 2 to N−1, the (n−1)th straight line connects an (n−1)th pin with an nth pin, and the nth straight line connects the nth pin with an (n+1) th pin.

3. The tape cassette according to claim 2, wherein
- the Nth pin is disposed at a position closest to the first guide and at a position in tangent with a straight line connecting the (N−1) th pin with the first guide.

4. The tape cassette according to claim 2, wherein
- the Nth pin is disposed at a position closest to the first guide, and
- a center of the Nth pin is disposed at a position away from a straight line connecting the (N−1) th pin and the first guide.

5. The tape cassette according to claim 1, wherein
- the plurality of pins includes a first pin and a second pin, among the plurality of pins, the first pin is the closest pin to the tape spool, among the plurality of pins, the second pin is the second closest pin to the tape spool, and the first pin is disposed at a position in tangent with a straight line connecting the tape spool with the second pin.

6. The tape cassette according to claim 5, wherein the first pin is aligned with the second pin.

7. The tape cassette according to claim 1, wherein a number of the plurality of pins is four.

8. The tape cassette according to claims 1, wherein the plurality of pins form the conveyance path into a zigzag path.

9. The tape cassette according to claim 1, wherein a housing has a first end portion and a second end portion separated from the first end portion in a first direction, and has a third end portion and a fourth end portion separated from the third end portion in a second direction, the second direction being orthogonal to the first direction, the tape spool is closer to the second end portion than the first end portion in the first direction, and is closer to the third end portion than the fourth end portion in the second direction, the first guide is closer to the fourth end portion than the third end portion in the second direction and is arranged at a center portion of the housing in the first direction, and the plurality of pins is closer to the second end portion than the first end portion in the first direction, and is closer to the fourth end portion than the third end portion in the second direction.

10. The tape cassette according to claim 1, wherein at least one of the pins is spaced away from the tape.

11. The tape cassette according to claim 1, wherein all of the pins contact the tape.

12. The tape cassette according to claim 1, wherein the plurality of pins includes a first pin and a second pin aligned with the first pin in a predetermined direction, the first pin contacts the print surface of the tape, and the second pin contacts the opposite surface of the tape.

13. The tape cassette according to claim 1, wherein the plurality of pins includes a first pin and a second pin aligned with the first pin in a predetermined direction, the first pin contacts the opposite surface of the tape, and the second pin contacts the print surface of the tape.

14. The tape cassette according to claim 1, wherein the plurality of pins includes a first pin and a second pin aligned with the first pin in a predetermined direction, the first pin contacts the opposite surface of the tape, and the second pin contacts the opposite surface of the tape.

15. The tape cassette according to claim 1, wherein the plurality of pins includes a first pin and a second pin aligned with the first pin in a predetermined direction, the first pin contacts the print surface of the tape, and the second pin contacts the print surface of the tape.

* * * * *